United States Patent [19]

Holthoff

[11] Patent Number: 4,827,751
[45] Date of Patent: May 9, 1989

[54] DEVICE FOR MACHINING ROLLS IN A ROLLING STAND

[75] Inventor: Helmut Holthoff, Düsseldorf, Fed. Rep. of Germany

[73] Assignee: Kocks Technik GmbH & Co., Hilden, Fed. Rep. of Germany

[21] Appl. No.: 80,410

[22] Filed: Jul. 31, 1987

[30] Foreign Application Priority Data

Sep. 12, 1986 [DE] Fed. Rep. of Germany ....... 3631146

[51] Int. Cl.[4] .................. B21B 28/02; B24B 5/37; B24B 49/04
[52] U.S. Cl. ............................ 72/236; 51/88; 51/165.88; 51/289 R; 72/21
[58] Field of Search ............... 72/236, 199, 40, 8, 72/10, 11, 21; 51/165.87, 165.88, 289 R, 5 D, 88

[56] References Cited

U.S. PATENT DOCUMENTS 1,086,806  2/1914  Collins, Sr. ................. 72/236
4,479,374  10/1984  Feldmann et al. ........... 72/236
4,548,064  10/1985  Bohnenkamp ............... 72/236

FOREIGN PATENT DOCUMENTS 0068410  4/1983  Japan ........................... 72/199

Primary Examiner—Robert L. Spruill
Assistant Examiner—Steven B. Katz
Attorney, Agent, or Firm—Buchanan Ingersoll; Paul A. Beck

[57] ABSTRACT

A device for machining a plurality of rolls (4) which are mounted ready for use in a rolling stand (3) and form a common sizing pass (6) has at least one tool (5) which is disposed outside the sizing pass (6) for machining the working surfaces of the roll. In order that the shape and size of the sizing pass formed by the rolls is as accurate as possible, a measuring device (8) engages in the sizing pass (6), and a computer (10) compares its actual values with predetermined desired values, the resulting error signals being used to control the tool via servomotors (13, 14).

9 Claims, 4 Drawing Sheets

DEVICE FOR MACHINING ROLLS IN A ROLLING STAND

FIELD OF THE INVENTION

The invention relates to a device for machining the working surfaces of a plurality of rolls which are mounted ready for use in a rolling stand and form a common sizing pass, in which, outside the sizing pass, at least one tool is radially and axially guided on at least one driven roll in dependence upon the shape and size of the sizing pass.

DESCRIPTION OF RELATED ART

In a known device of this type, initially only one of the rolls forming the sizing pass is machined using a grinding wheel. This grinding wheel is advanced in the radial direction against the working surfaces of the roll at a point on the periphery of the roll which is offset by 90° with respect to the sizing pass. The profile of the grinding wheel is the profile to be machined into the working surface of the roll. In order to be able to correctly adjust the grinding wheel and to be able to monitor the formation of the desired profile of the working surface of the roll during the machining operation, light beams are transmitted through the sizing pass and with the aid of an optical system, cause the contours of the sizing pass to appear on an enlarged scale on a ground grass screen. Since the optical enlargement factor is known, the silhouette visible on the ground glass screen can be used to determine both the shape and the size of the sizing pass. In this way, it is also possible to determine when the profiled grinding wheel, or some other tool, has been advanced sufficiently and has machined the desired profile into the roll. In order to be able to machine the other roll or rolls forming the sizing pass, it is necessary to turn the rolling stand inside the device about the rolling axis of the sizing pass to move one or other of the rolls into the region of the tool so that it can be machined in the same way. In the known device, the rolling stand is turned by a special device, so that it does not have to be detached and then refitted.

Although the same optical and mechanical means are available for machining the second and any other rolls, slight, but unwelcome deviations from the desired ideal shape of the sizing pass and from the desired dimensions are produced. One of the reasons for these inaccuracies is that the contours of the sizing pass are not as clearly defined as necessary, because small chips and drops of cooling liquid get into the sizing pass during machining and also produce a shadow on the ground glass screen which cannot be distinguished from the shadow of the roll contour. It is thus more difficult to assess the silhouette and to continuously adjust the tool with reference thereto. The adjustment of the tool differs in particular from roll to roll. But even if the tool is accurately adjusted for machining the first roll, and this setting is retained for machining the next roll or rolls, the resulting sizing pass still deviates from the desired shape and size because the rolling stand with its clamping and reception surfaces, and the rolls and their bearings and supports, have manufacturing tolerances. Consequently, once the rolling stand has been turned in order to machine the next roll, it is no longer precisely in its theoretical, desired position. So although the tool maintains its position, the shape and dimensions of the sizing pass deviate.

SUMMARY OF INVENTION

It is an object of the invention to provide a device of the type mentioned at the beginning, using which it is possible to achieve improved machining of working surfaces and to produce a sizing pass which corresponds more accurately to the desired shape and dimensions.

According to the present invention, a device for machining the working surfaces of a plurality of rolls which are mounted ready for use in a rolling stand and which form a common sizing pass comprised at least one tool outside the sizing pass, the tool being adapted to be radially and axially guided over at least one driven roll, a measuring device adapted to engage in the sizing pass and to continuously or repeatedly measure its cross-sectional dimensions, a computer for comparing the actual values obtained by the measuring device with predetermined desired values and means for guiding the tool continuously over the working surface of the roll in dependence upon the differences between the desired values and the actual values.

A sizing pass is the free run-through cross-section which is in the plane of the axes of rotation of the rolls and which is defined by the working surfaces of the rolls. If the sizing pass is accurately measured, and each measured value compared with an associated desired, and hence predetermined, value, any deviation will produce a differential or error value, which serves as a control value. The basic principle applied, namely determining an actual value, comparing said actual value with a desired value and making an adjustment based on the error value, is known, so that the invention is to be found above all in the application of this principle in a device for machining the working surface of rolls and in that, during machining of the working surfaces of the rolls, continuous and direct measurements are made in the sizing pass, and the tool is guided accordingly.

As a result, all the manufacturing tolerances of the rolling stand, such as for example, those of the reception surfaces and the roll bearing sand support, as well as all the manufacturing tolerances of the device, are advantageously eliminated. The actual values come directly from the sizing pass, and are transmitted with a high degree of accuracy in the form of numerous measurement pulses and compared with the desired values in a computer with the same degree of accuracy. The resulting error values in turn present an accurate basis for adjusting the tool, such that it is possible to achieve a substantially more exact sizing pass. The measuring device, computer and tool adjustment operate fully automatically, thus avoiding misadjustments by hand.

In a preferred embodiment of the invention, the measuring device has a sensor which moves in an alternating or rotating manner within the plane of the sizing pass. This sensor may, for example, be a detector pin which senses the working surfaces of the rolls and whose deflection movements generate the measurement pulses. The sensor may also be an air jet which operates in a contactless manner in such a way that very small changes in air pressure, caused by deviations in the distance between the air jet and the working surfaces of the rolls, generate measurement pulses for the computer. This sensor and other known sensors pass over the working surfaces to be measured several times within a relatively short period, and thus continuously determine the size and shape of the sizing pass at any one moment, and hence signal immediately when the desired sizing pass has been obtained. The measurement pulses are received and evaluated in the computer. The computer determines, for example, the end of the machining operation by the fact that the measured actual values are the same as the programmed desired values. There are no longer any error values, and hence the tool is not advanced any further. A signalling device which responds to this can indicate the end of the machining operation to the operator, and can, if necessary, switch off the device.

It is particularly advantageous that the path of motion of the sensor can deviate from the contour of the sizing pass. The extent to which this is possible depends on the type and method of operation of the sensor. In order to obtain as accurate a measurement as possible, it is recommended in most cases to allow the sensor to rotate about a stationary axis of rotation, although it is also possible to move it parallel to the desired contours of the working surface.

It is recommended to guide the tool over the roll with control of the path of travel of the tool. It is not necessary for the tool, for example a grinding wheel, to have the desired shape of the working surface. On the contrary, the tool used has a cutting region which is substantially narrower than the width of the working surface of the roll. The tool is guided over the roll in the axial and radial direction in such a way that the desired profile is produced. As a result, it is not necessary for the tool to be made in the exact shape of the profile of the working surface or for it to be kept in this shape, despite wear, by repeated reworking. Moreover, very different working surface profiles can be produced by the same tool using the path control.

Furthermore, the invention also provides for a device to monitor the shape and cutting ability of the tool. This device can use the same sensor as the one which in any case measures the sizing pass. This type of sensor is so sensitive that it is able to detect a higher surface roughness of the working surfaces. As this is generally caused by defective cutting ability of the tool, the sensor signals it to the computer. The computer recognises the surface roughness from the type of measurement pulse. The device in this case thus merely comprises a particular programming of the computer which picks up from the sensor, which is already available, measurement pulses of this type and records them separately. Any deviation in the shape of the tool, for example because the grinding wheel or cutter is worn, is picked up by the sensor because, despite the grinding wheel being sufficiently advanced in the radial direction, the cut-in contour of the working surfaces still deviates considerably from the desired shape, that is, differential values are obtained which are far too high and which should not be found at this point in the machining operation and with the grinding wheel in this advanced position. Such deviations can be signalled separately.

In general, it is advisable to dispose a device for cleaning the working surface of the roll in the direction of rotation of the roll between the tool and the measuring device. Such a cleaning device can comprise a brush, compressed air jet or similar. It prevents chips or cooling liquid entering the sizing pass, dirtying the sensor and affecting the measurement result. Furthermore, it is recommended that the tool be displaceable radially and parallel to the axis of rotation of the roll. It is thus possible to obtain any useful and desired working surface contour, the movements of the tool being executed directly by the sensor by way of the computer in dependence upon the differential values established. On the other hand, the rolling stand and rolls can be displaced instead of the tool radially and parallel to the axis of rotation of the roll.

In a further embodiment of the invention, a separate tool and tool guide is provided for each roll of the rolling stand. As a result, it is possible to machine all the rolls of the rolling stand at the same time, which means a considerable saving in time and an increase in the output of the device. Even this embodiment of the invention only requires one sensor and one computer, as both are able to provide the error values required for all, for example, three, tools and/or tool guides. It is, of course, necessary that each tool guide should receive only those error values which are associated with the corresponding roll. This can be ensured by programming the computer accordingly. However, it is then necessary for the tools to be separately displaceable radially and parallel to the axis of rotation of the roll, with the rolling stand firmly fixed, because displacing the rolling stand does not allow all the rolls to be machined individually at the same time.

BRIEF DESCRIPTION OF THE DRAWINGS

The invention will be further described, by way of example, with reference to the accompanying drawings, in which.

DESCRIPTION OF PREFERRED EMBODIMENTS

Figure 1:
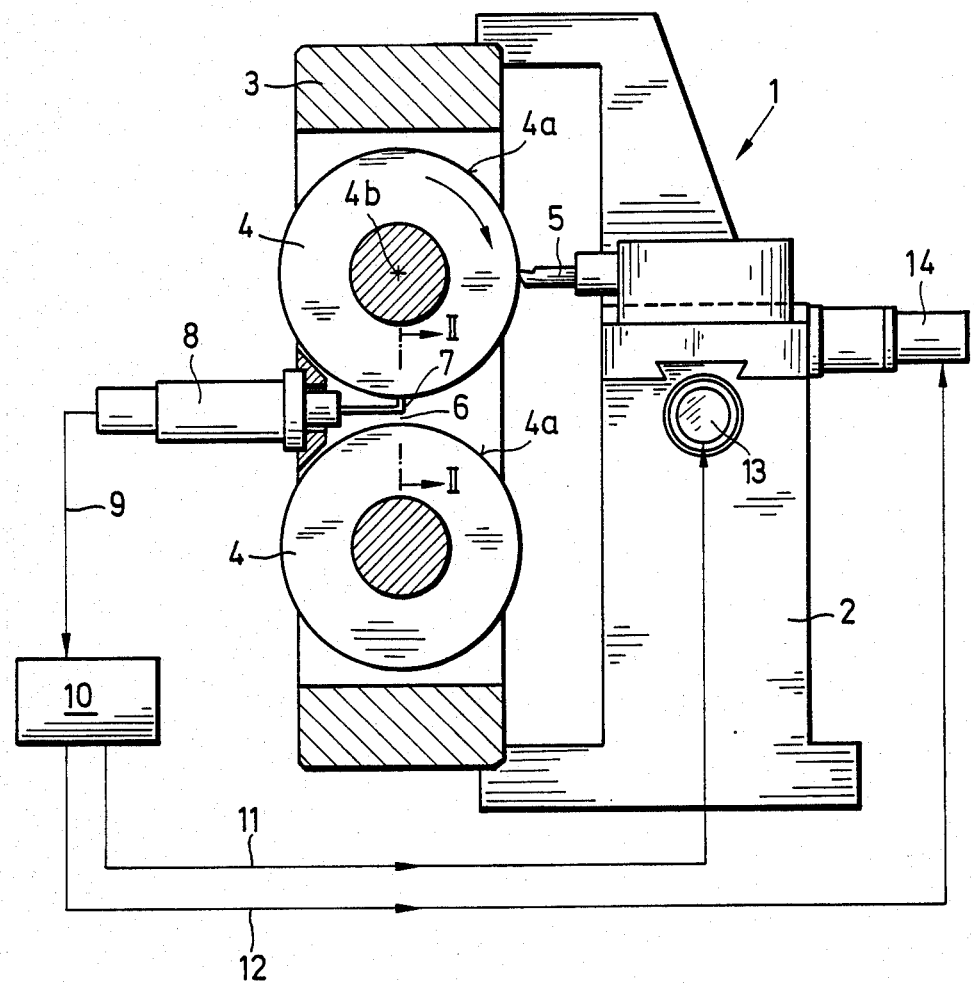
FIG. 1 is a schematic side view of a device according to the invention fitted to a two-roll stand.

FIG. 1 shows a device 1 which has a frame 2 in which a rolling stand is held and tightly clamped by known means (not shown). Furthermore, it is possible to turn the rolling stand 3 about its work material run-through axis so that any of the rolls 4 can be disposed at the top.

The rolls 4 have working surfaces 4a which may be cylindrical or profiled. The working surface 4a of the upper roll 4 can be machined using a turning tool 5. To this end, the turning tool can be moved both radially and axially with respect to the axis 4b of rotation of the roll.

The two rolls 4 together form a sizing pass 6 whose shape and size is dependent upon the type of machining of the working surfaces 4a by the turning tool 5. In the sizing pass 6, there is a sensor 7 which belongs to a measuring device 8 which is inserted in a centre bore in the rolling stand 3. The sensor 7 moves inside the sizing pass 6 in the plane designated II—II, whereby it senses the shape and size of the sizing pass 6 and transforms these into measurement pulses. These measurement pulses pass by way of an appropriate connecting line 9 to a computer 10 in which, as actual values, they are compared with desired values, which have already been entered, for the required sizing pass 6. Differences between the actual values from the measurement device 8 and the desired values are determined by the computer 10 and the resulting differential values or error signals are converted into adjusting pulses which are fed by way of connecting lines 11 and 12 to servomotors 13 and 14, which displace the tool 5 axially and radially with respect to the roll 4 by a desired amount. The shape alters correspondingly and the dimensions of the sizing pass 6 are increased, which is in turn detected by the measurement device 8 with the sensor 7. As the machining process continues, the actual values become closer to the desired values until they are the same and there are no longer any error signals, that is, no further advance is carried out by the servo-motors 13 and 14. The machining of the working surface of the upper roll 4 is thus completed.

To machine the lower roll 4, it can be moved into the position of the upper roll 4 by correspondingly turning or displacing the rolling stand 3 in the frame 2, which can be done by a revolving table or carriage (not shown) in the device 1. Furthermore, the device 1 can be designed in such a way that it is disposed beneath the rolling stand 3 and the rolling stand 3 lies horizontally. This position is shown by FIG. 1 if the sheet of drawings is rotated by 90°. Another way to machine the second roll 4 is to dispose a second turning tool 5 correspondingly in the region of the second roll 4 and to provide servomotors 13 and 14 which can be supplied with adjusting pulses by the same measurement device 8 and the same computer 10.

Figure 2:
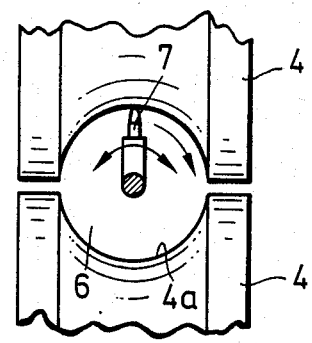
FIG. 2 is a section along the line II—II in FIG. 1.
Figure 3:
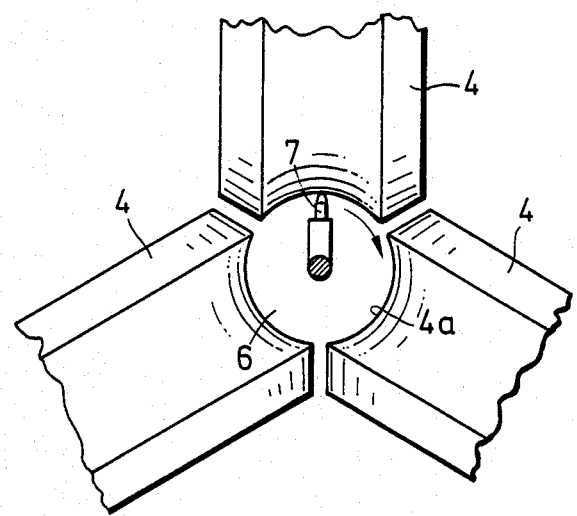
FIG. 3 is a section as in FIG. 2, but showing a stand with three rolls per pass.

FIGS. 2 and 3 show that rolling stands 3 with two or more rolls 4 per pass can be machined on the device according to FIG. 1. They also show that the sensor 7 of the measuring device 8 inside the sizing pass 6 either rotates or moves in an alternating manner on a circular or arcuate path and in doing so senses the working surfaces 4a of the rolls 4. The distance between the working surfaces 4a and the axis of rotation is measured with the sensor 7 in a variety of angular positions, and transmitted to the computer 10. The sensor 7 may be a contacting sensing pin or a contactless air jet, or a head operating with light beams, ultrasonics or similar method. In contrast to FIGS. 2 and 3, the sensor 7 does not have to move in a circular path, but may move in any other known path, which does not even need to be parallel to the contours of the working surfaces 4a.

Figure 4:
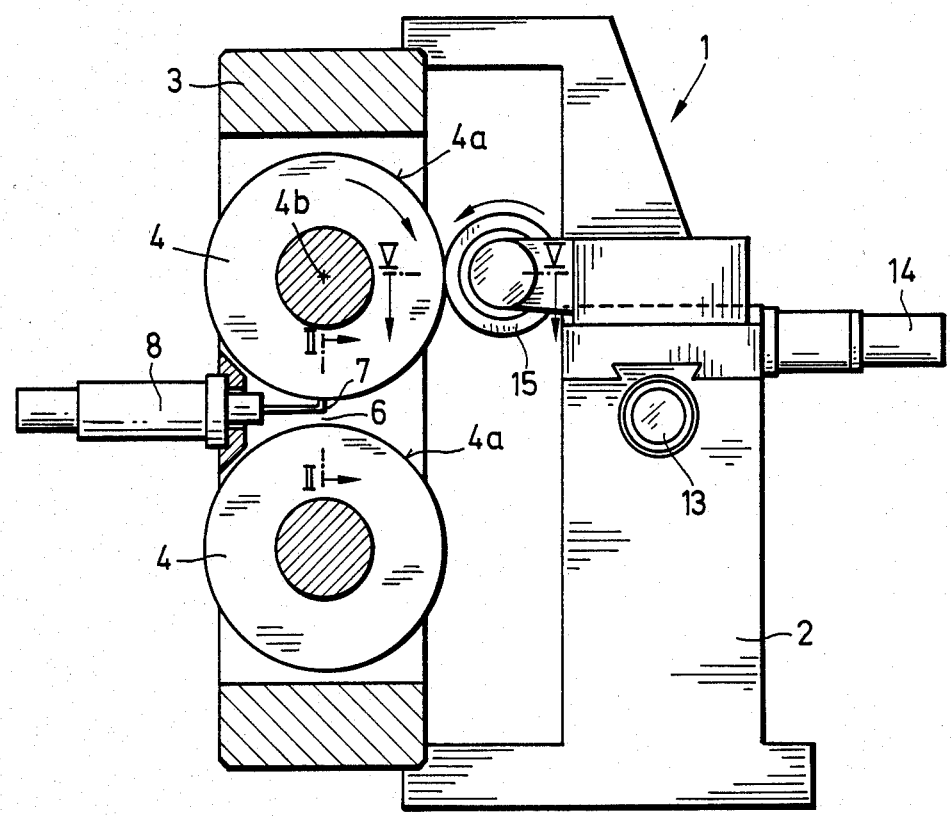
FIG. 4 shows a device as in FIG. 1 but with a grinding wheel as the tool.

FIG. 4 differs from FIG. 1 essentially only in that, in order to simplify the drawing, the computer 10 and connecting lines 9, 11 and 12 have been omitted and in that, in place of the turning tool 5, a motor-driven grinding wheel 15 is provided as the machining tool. A plurality of such grinding wheels may be provided, for example one for each roll 4.

Figure 5:
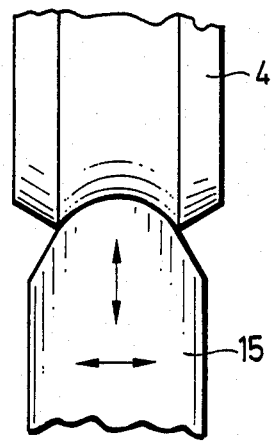
FIGS. 5 and 6 are sections along the line V—V in FIG. 4.

FIG. 5 shows how the grinding wheel 15 can be adjusted in the radial and axial directions by the servo-motors 14 and 13. The grinding wheel 15 is profiled in such a way that, given the correct radial position, the working surface 4a and hence the sizing pass 6, are given the desired shape. Axial adjustment of the grinding wheel 15 serves merely to compensate manufacturing tolerances. It is thus possible to adjust the grinding wheel 15 such that it is exactly central with respect to the roll 4.

Figure 6:
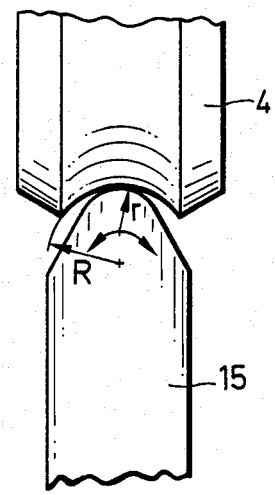

In FIG. 6, however, the grinding wheel 15 does not have the profile radius R which is, for example, to be machined into the roll 4, but a considerably smaller profile radius r. The centre of this smaller radius r is moved along the circular or arcuate path shown by the two arrows, thus producing the radius R in the roll 4. The necessary movement of the gringing wheel 15 is also carried out by the servo-motors 13 and 14 which are controlled accordingly by the computer 10.

I claim:

1. A device for machining the working surfaces of a plurality of rolls which are mounted ready for use in a rolling stand and which form a common sizing pass, comprising at least one tool outside the sizing pass, said tool positioned to be radially and axially guided over the working surface of a sizing pass of at least one driven roll, a measuring device positioned inside the sizing pass, said measuring device positioned to continuously or repeatedly measure the cross-sectional dimensions of said sizing pass, a computer for comparing actual values obtained by the measuring device with predetermined desired values, means for guiding the tool continuously over the working surface of the roll in dependence upon the differences between the desired values and the actual values, and signal means for passing a signal between said computer and said means for guiding the tool.

2. A device as claimed in claim 1, in which the measuring device has a sensor which moves in a reciprocating or rotating manner within the plane of the sizing pass.

3. A device as claimed in claim 2, in which the path of motion of the sensor deviates from the desired shape of the sizing pass.

4. A device as claimed in claim 2, in which the tool is guided so as to be displaced along a controlled path with respect to the roll.

5. A device as claimed in claim 1, 2, 3 or 4, in which means are provided to monitor the shape and cutting ability or performance of the tool.

6. A device as claimed in claim 1, 2, 3 or 4, further comprising means for cleaning the working surface of the roll disposed in the direction of rotation of the roll between the tool and the measuring device.

7. A device as claimed in claim 1, 2, 3 or 4, in which the tool can be displaced both radially and parallel to the axis of rotation of the roll.

8. A device as claimed in claim 1, 2, 3 or 4, in which the rolling stand and rolls are displaceable radially and parallel to the axis of rotation of the rolls.

9. A device as claimed in claim 1, 2, 3 or 4, in which a separate tool with a tool guide is provided for each roll of the rolling stand.

* * * * *